United States Patent [19]
Filter

[11] Patent Number: 4,562,916
[45] Date of Patent: Jan. 7, 1986

[54] METHOD AND APPARATUS FOR TRANSFERRING CIGARETTES FROM TWO MAKERS INTO A FILTER TIPPING MACHINE

[75] Inventor: Willi Filter, Hamburg, Fed. Rep. of Germany

[73] Assignee: Hauni-Werke Körber & Co. KG, Hamburg, Fed. Rep. of Germany

[21] Appl. No.: 642,529

[22] Filed: Aug. 20, 1984

[30] Foreign Application Priority Data

Aug. 29, 1983 [DE] Fed. Rep. of Germany ....... 3331065

[51] Int. Cl.⁴ ............................................. B65G 47/26
[52] U.S. Cl. ................... 198/432; 198/450; 198/441; 198/426; 198/457; 131/282
[58] Field of Search ............. 198/457, 499, 426, 427, 198/432, 436, 450, 438, 441, 722; 131/107, 282

[56] References Cited

U.S. PATENT DOCUMENTS

| | | | |
|---|---|---|---|
| 2,649,761 | 8/1953 | Edwards | 198/450 X |
| 3,265,183 | 8/1966 | Menge | 198/438 X |
| 3,602,357 | 8/1971 | Schubert | 198/441 X |
| 3,685,633 | 8/1972 | Rudszinat et al. | 198/438 |
| 3,863,750 | 2/1975 | Giatti | 198/438 X |
| 3,952,865 | 4/1976 | Rudszinat et al. | 198/441 X |
| 4,167,995 | 9/1979 | Schumacher | 198/458 |
| 4,274,533 | 6/1981 | Abe | 198/450 |

FOREIGN PATENT DOCUMENTS 2110065 6/1983 United Kingdom ................ 131/282

*Primary Examiner*—Joseph E. Valenza
*Assistant Examiner*—Michael Stone
*Attorney, Agent, or Firm*—Peter K. Kontler

[57] ABSTRACT

Two cigarette making machines discharge discrete files of coaxial plain cigarettes which are moved axially in parallel guides, and successive foremost cigarettes in each guide are engaged and accelerated by a discrete rotating cam which propels the cigarettes into the oncoming axially parallel peripheral flutes of a rotating drum-shaped conveyor. Each flute receives a cigarette from each of the two guides and the distance between a pair of neighboring flutes on the conveyor exceeds the distance between the two files of cigarettes.

17 Claims, 5 Drawing Figures

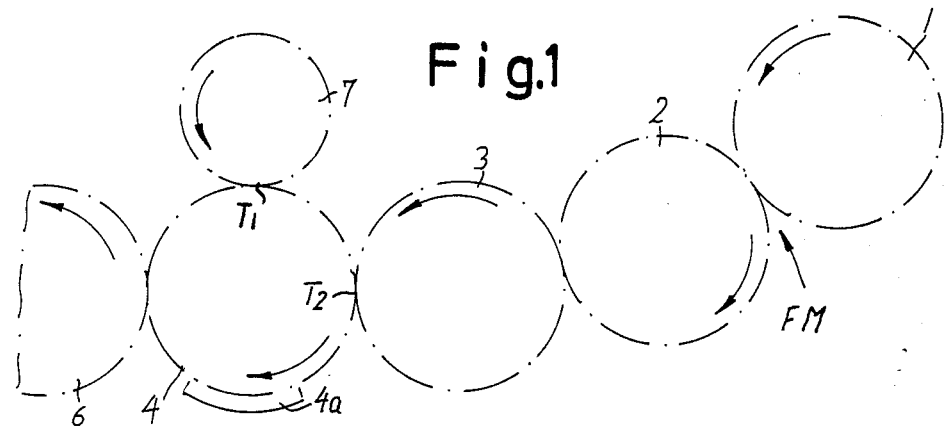
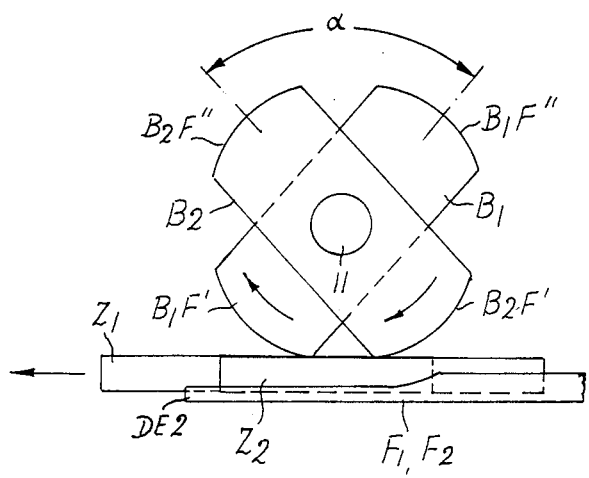
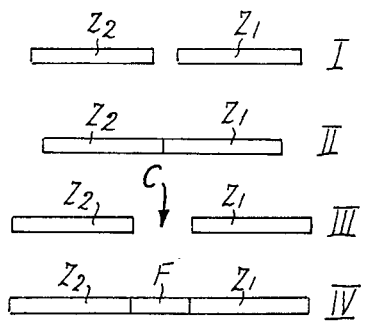
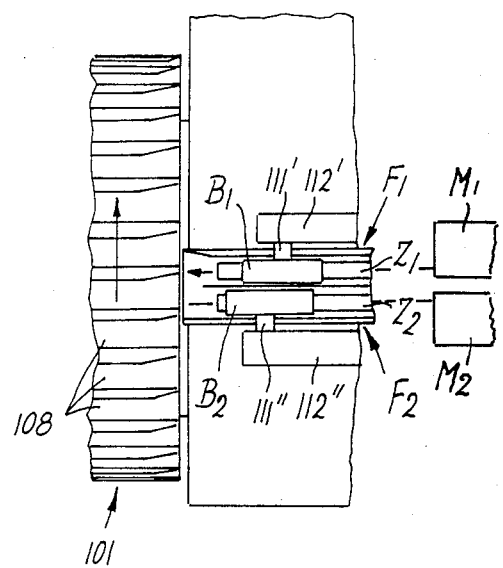

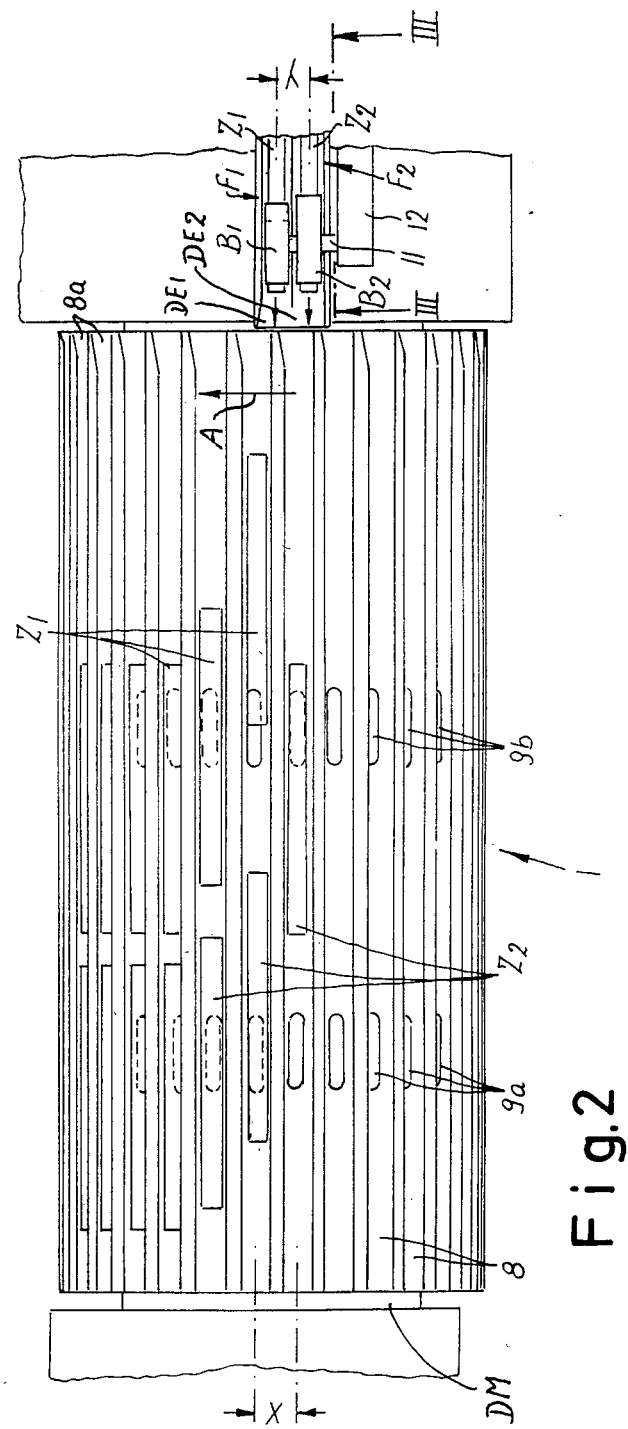

METHOD AND APPARATUS FOR TRANSFERRING CIGARETTES FROM TWO MAKERS INTO A FILTER TIPPING MACHINE

BACKGROUND OF THE INVENTION

The present invention relates to a method and apparatus for manipulating rod-shaped articles of the tobacco processing industry, and more particularly to improvements in a method and apparatus for transferring cigarettes or the like between making means and processing tipping machine. Still more particularly, the invention relates to improvements in a method and apparatus for transferring plain cigarettes or like rod-shaped articles from several makers to a common filter tipping machine.

It is already known to place two cigarette makers next to each other and to sever the cigarette rods which are formed in such makers while the rods advance along two adjacent parallel paths so that each row yields a series or file of plain cigarettes of double unit length. Reference may be had to German Offenlegungsschriften Nos. 32 19 556 and 32 40 555 which disclose transmission-driven twin flutes for reception of pairs of plain cigarettes of double unit length and the transport of such twin flutes along an endless path. The flutes of each pair deposit the respective plain cigarettes of double unit length into the peripheral flutes of a drum-shaped conveyor which forms part of or is adjacent to the filter tipping machine. The pitch of the flutes on the conveyor (i.e., the distance between the centers of neighboring flutes, as considered in the circumferential direction of the drum) is the same as the distance between the centers of twin flutes of the transmission-driven transfer mechanism between such conveyor and the two cigarette makers. Such apparatus operate properly as long as the just outlined conditions prevail, i.e., as long as the pitch of the flutes on the drum-shaped conveyor is the same as the distance between the centers of twin flutes in the transfer mechanism. However, it is often desirable and advantageous to maintain successive cigarettes on the conveyor of the filter tipping machine at a greater distance from one another than the distance between the cigarettes which are produced by the two makers and are introduced into the respective flutes of the transfer mechanism. As a rule, the desirable or optimum spacing between successive cigarettes in a filter tipping machine is determined by the mutual spacing of successive cigarettes on the so-called rolling conveyor in which pairs of plain cigarettes are united with filter mouthpieces of double unit length by convoluting adhesive-coated uniting bands therearound. The pitch of the flutes on such rolling conveyor is 12 mm times pi.

German Pat. No. 24 00 088 proposes to increase the mutual spacing of cigarettes subsequent to the transfer of the articles onto a conveyor of the filter tipping machine. Such proposal is not satisfactory, mainly because abrupt acceleration of plain cigarettes invariably causes the escape of at least some tobacco particles at the ends of the cigarettes with attendant softening of the ends.

OBJECTS AND SUMMARY OF THE INVENTION

An object of the invention is to provide a novel and improved method of altering the mutual spacing of plain cigarettes during transfer from the maker means to a filter tipping machine without losses in tobacco, without deformation and/or without other undesirable influences upon the conveyed articles.

Another object of the invention is to provide a novel and improved method of automatically increasing the mutual spacing between neighboring cigarettes on their way from two makers to a filter tipping machine.

A further object of the invention is to provide a method which ensures that the transfer of cigarettes from the makers to the tipping machine can be carried out at the rate which is required in a modern production line and that the predictability of transfer and/or of an increase in mutual spacing of cigarettes is not dependent upon the selected speed of transport of articles to the tipping machine.

An additional object of the invention is to provide a novel and improved method of changing the direction of transport of rod-shaped articles between plural makers and a processing machine.

Another object of the invention is to provide a novel and improved apparatus for the practice of the above outlined method and to construct and assemble the apparatus in such a way that it can automatically increase the mutual spacing of cigarettes or like articles on their way from several makers of cigarettes to a processing machine, especially to a filter tipping machine.

An addition object of the invention is to provide the apparatus with novel and improved article accelerating means as well as with novel and improved means for changing the direction of transport of articles during transfer from several makers into the flutes of a rotary drum-shaped conveyor forming part of or cooperating with a filter tipping machine.

Another object of the invention is to provide a production line for the making and processing of cigarettes which embodies the above outlined apparatus.

One feature of the invention resides in the provision of a method of manipulating rod-shaped articles of the tobacco processing industry, particularly for transferring plain cigarettes from several discrete cigarette makers to a common filter tipping machine. The method comprises the steps of establishing for the rod-shaped articles discrete first and second elongated paths which are parallel to each other, which are spaced apart from one another by a first distance and which have adjacent discharge ends, establishing a plurality of third paths (e.g., by the flutes at the periphery of a rotary drum-shaped conveyor) which are parallel to the first and second paths, which are spaced apart from one another by second distances deviating from the first distance (in many instances, each second distance will exceed the first distance) and which have intake ends disposed in a plane adjacent to the discharge ends of the first and second paths, circulating the third paths about a fixed axis which is parallel to and equidistant from the third paths, advancing the articles axially along the first and second paths, and individually and asynchronously propelling into successive third paths first an article from one and thereupon an article from the other of the first and second paths so that each third path receives a pair of coaxial articles which are normally spaced apart from one another. The propelling step can include alternatively accelerating the foremost articles in the first and second paths.

The circulating step can comprise circulating the third paths in a predetermined direction so that the intake ends of successive third paths first advance past the discharge end of the second path and thereupon past the discharge end of the first path. The propelling step then preferably includes accelerating successive foremost articles in the second path ahead of successive foremost articles in the first path.

If the articles of each pair of articles in the third paths are spaced apart from one another, the method preferably further comprises the first additional step of moving at least one article of each pair of articles axially toward the other article of the respective pair (e.g., into actual abutment with the other article) and a second additional step of thereupon moving at least one article of each pair away from the other article of the respective pair so as to establish between the articles of successive pairs clearances of predetermined width. Each such clearance can receive a filter plug of double unit length.

The two additional steps are preferably preceded by the step of removing successive pairs of articles from the respective third paths.

Another feature of the invention resides in the provision of an apparatus for manipulating rod-shaped articles of the tobacco processing industry, particularly for transferring plain cigarettes from two discrete cigarette makers into a common filter tipping machine. The apparatus comprises first and second guide means which respectively define first and second parallel elongated paths disposed at a first distance from one another and having adjacent discharge ends, a preferably drum-shaped conveyor defining a plurality of third paths (each such path can be defined by a discrete axially parallel peripheral flute of the drum-shaped conveyor) which are disposed at different second distances from one another (in many instances, each second distance will exceed the first distance), which are parallel to the first and second paths and whose intake ends are disposed in a common plane adjacent to the discharge ends of the first and second paths, means for moving the conveyor so as to circulate the third paths about a fixed axis which is parallel to and equidistant from the third paths, means (e.g., two discrete cigarette makers) for respectively supplying first and second files of coaxial articles into the first and second paths so that the articles advance axially toward the respective discharge ends, and first and second accelerating means which are disposed in the regions of the respective discharge ends and serve to propel successive foremost articles from the respective guide means into the intake ends of successive third paths at intervals so that the propulsion of articles from the first path does not coincide with the propulsion of articles from the second path. This can be readily achieved by properly relating the operation of the two accelerating means to the RPM of the conveyor and/or vice versa.

Each of the accelerating means can comprise a rotary member (e.g., a cam with one or more lobes) and each such rotary member has at least one article-engaging surface, such as a convex surface on a lobe of the respective cam. The article-engaging surfaces of the two rotary members are angularly offset relative to each other.

The first and second accelerating means can be spaced apart from one another, as considered in the longitudinal direction of the first and second paths. Alternatively, the two rotary members can be mounted for rotation about a common axis which extends at right angles to the axis of the conveyor.

The apparatus can comprise a second conveyor which receives pairs of articles from successive third paths on the drum-shaped conveyor and includes means for moving at least one article of each pair of articles axially to a predetermined position relative to the other article of the respective pair (particularly into abutment with the other article). As a rule, the articles of pairs of articles in the third paths are spaced apart from one another, and the moving means of the second conveyor is then designed to move the one article of each pair toward the other article so as to ensure that the two articles are then located at a predetermined distance from one another (this distance can equal exceed zero). Such apparatus preferably further comprises a third conveyor which serves to receive pairs of articles from the second conveyor and includes means for moving at least one article of each pair axially and away from the other article of the respective pair so that the articles of each pair define between themselves a clearance or gap of predetermined width (the width of such clearance suffices to allow for insertion of a filter plug of double unit length). To this end, the third conveyor can comprise a first set of receiving means each of which is arranged to receive the one article of a pair of articles which are taken over from the second conveyor and a second set of receiving means for the other articles of the pairs of articles which are removed from the second conveyor. The moving means of the third conveyor then comprises means for moving at least one set of receiving means toward and away from the other set of receiving means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary schematic front elevational view of a filter tipping machine which receives and manipulates pairs of plain cigarettes in accordance with the method of the present invention;

FIG. 2 is an enlarged plan view of one of the conveyors which are shown in FIG. 1 and of the guide means and accelerating means of the improved apparatus;

FIG. 3 is an enlarged view as seen in the direction of arrows from the line III—III of FIG. 1 and shows the rotary members of the two accelerating means adjacent to the discharge ends of the respective first and second paths;

FIG. 4 is a view similar to that of FIG. 2 but showing two differently positioned accelerating means as well as two discrete makers which supply cigarettes into the respective first and second paths; and FIG. 5 shows successive stages of manipulation of pairs of plain cigarettes on four of the conveyors which are shown in FIG. 1.

DESCRIPTION OF THE PREFERRED EMBODIMENTS

FIG. 1 shows certain components of production line which includes two cigarette makers (or the makers $M_1$ and $M_2$ in FIG. 4) and a filter tipping machine FM. The reference character 1 denotes a drum-shaped conveyor (shown in greater detail in FIG. 2) which serves to change the direction of movement of plain cigarettes $Z_1$ and $Z_2$ from axial to sidewise movement (namely from axial movement to a movement at right angles to the axes of the respective plain cigarettes). A conveyor which can be used for such purposes is disclosed in commonly owned U.S. Pat. No. 3,664,891 to Schubert et al. The difference is that the conveyor of Schubert et al. is designed to simultaneously receive pairs of plain cigarettes in each of its successive axially parallel peripheral flutes. In order to be suitable for use in the apparatus of the present invention, the conveyor of Schubert et al. is slightly modified by altering the controls for evacuation of air from its peripheral flutes in such a way that the second cigarette in each flute is braked with a delay following the braking of the previously introduced cigarette. This merely involves a change in the location of one or more air-evacuating passages in the conveyor of Schubert et al.

The conveyor 1 delivers pairs of coaxial plain cigarettes into successive flutes of a so-called shifting conveyor 2 which may be of the type disclosed in U.S. Pat. No. 2,821,201 to Brunswig. The purpose of the conveyor 2 is to shift the cigarettes which constitute the aforementioned pairs axially toward and into contact with each other. The axial length of the conveyor 2 need not be pronounced in view of the fact that, in the illustrated apparatus, it merely serves to move pairs of coaxial cigarettes into abutment with one another. Once the cigarettes of successive pairs are brought into actual contact with each other, they are transferred into the peripheral flutes of a third drum-shaped conveyor 3 which may be of the type disclosed in commonly owned U.S. Pat. No. 4,200,179 to Hinz. The conveyor 3 embodies two sets of shifting means for increasing the distance between the cigarettes of successive pairs to a predetermined distance (note the clearance or gap C in FIG. 5) which suffices to provide room for a filter plug F (FIG. 5) of double unit length therebetween.

Once the pairs of cigarettes are properly spaced apart from one another, they are delivered into successive flutes of a fourth rotary drum-shaped conveyor 4 which is the so-called assembly conveyor of the filter tipping machine FM, e.g., a machine of the type known as MAX or MAX S (manufactured by the assignee of the present application). Filter plugs F of double unit length are supplied by an inserting and accelerating conveyor 7 which places a filter plug F into each flute of the conveyor 4 between the cigarettes of the respective pair so that each flute of the conveyor 4 contains a group of three rod-shaped articles including two spaced-apart plain cigarettes $Z_1$, $Z_2$ of unit length and a filter plug F of double unit length between them.

The thus obtained groups of three coaxial rod-shaped articles each are transferred onto a rolling conveyor 6 whereon the groups are contacted by uniting bands made of cigarette paper, imitation cork or other suitable wrapping material which is convoluted around the respective groups in such a way that the groups are converted into filter cigarettes of double unit length. Each uniting band then forms a tube which completely surrounds the respective filter plug F as well as the adjacent end portions of the respective plain cigarettes $Z_1$ and $Z_2$. The conveyors 6 and 7 are standard components of the filter tipping machine FM, e.g., a machine of the type known as MAX or MAX S.

Referring to FIG. 2, the conveyor 1 has a set of axially parallel peripheral flutes 8 each of which communicates with two elongated slot-shaped suction ports 9a and 9b which are spaced apart from one another, as considered in the axial direction of the conveyor 1. Each such elongated slot-shaped suction port can be replaced with two or more aligned round or nearly round suction ports without departing from the spirit of the invention.

The entire cigarette making means are not shown in FIG. 2. The right-hand portion of this Figure merely shows two elongated parallel guides $F_1$ and $F_2$ each of which forms part of and guides the cigarettes $Z_1$ and $Z_2$ issuing from the respective maker. Successive cigarettes $Z_1$ in the guide $F_1$ are accelerated by a first rotary accelerating device in the form of a disc cam $B_1$ having one or more lobes, and successive cigarettes $Z_2$ are accelerated by a second disc-shaped cam $B_2$ which is adjacent to the path defined by the guide $F_2$. The accelerating cams $B_1$ and $B_2$ are mounted on a common shaft 11 which is the output element of a variable-speed transmission 12.

FIG. 3 shows that the cam $B_1$ has two lobes $B_1F'$ and $B_1F''$ which are disposed diametrically opposite each other with reference to the axis of the shaft 11 and accelerate successive plain cigarettes $Z_1$ when the transmission 12 drives the shaft 11 in a clockwise direction, as viewed in FIG. 3. The lobes of the cam $B_1$ have convex surfaces which engage and propel successive cigarettes $Z_1$ into the intake ends 8a of successive flutes 8 of the conveyor 1. The second accelerating cam $B_2$ is angularly offset relative to the cam $B_1$ through an angle alpha which, in the illustrated embodiment, approximates 90 degrees. The two lobes of the cam $B_2$ are shown at $B_2F'$ and $B_2F''$. These lobes alternate with the lobes of the cam $B_1$, as considered in the circumferential direction of the shaft 11. The magnitude of the angle alpha depends upon the difference between the distance Y from the center of the guide $F_1$ to the center of the guide $F_2$ and the distance X from the center of a flute 8 to the center of the neighboring flute in the periphery of the conveyor 1. In other words, the magnitude of the angle alpha is a function of the ratio of the distance between the axes of two cigarettes $Z_1$ and $Z_2$ in the guides $F_1$ and $F_2$ to the distance between the axes of two cigarettes $Z_1$ or $Z_2$ in two neighboring flutes 8. In FIG. 3, the angle alpha is slightly less than 90 degrees.

The intake ends 8a of the flutes 8 on the conveyor 1 are disposed in a plane which is adjacent to the discharge ends $DE_1$ and $DE_2$ of the (first and second) paths respectively defined by the guides $F_1$ and $F_2$. The flutes 8 define a plurality of third paths which are parallel to the first and second paths and are parallel to and equidistant from the axis of the conveyor 1. The latter can be driven at any one of a number of different speeds by a drive means or moving means DM, e.g., a system of gears which receive torque from the main prime mover of the production line including the filter tipping machine FM.

The mode of operation of the improved apparatus is as follows:

A cigarette $Z_1$ which advances (by moving axially along the respective guide $F_1$) into the range of one of the two lobes on the accelerating cam $B_1$ is propelled axially and into the oncoming flute 8 of the conveyor 1 ahead of the next cigarette $Z_2$. The speed to which the lobe $B_1F'$ or $B_1F''$ of the cam $B_1$ accelerates the cigarette $Z_1$ (i.e., the peripheral speed of the cam $B_1$) is related to the peripheral speed of the conveyor 1 in such a way that the accelerated cigarette $Z_1$ invariably enters the oncoming flute 8.

The cigarette $Z_2$ which is parallel with and adjacent to the just discussed (propelled) cigarette $Z_1$ is located in the guide $F_2$ and is accelerated by the lobe $B_2F'$ or $B_2F''$ with a delay which depends on the magnitude of the angle alpha. This angle is selected with a view to ensure that the cigarette $Z_2$ enters the next oncoming flute 8, i.e., not the flute which has received the cigarette $Z_1$. Thus, when the production line including the conveyor 1 and the makers with guides $F_1$ and $F_2$ is started, the first oncoming flute 8 of the conveyor 1 only receives a cigarette $Z_1$ but each next-following flute receives first a cigarette $Z_2$ and thereupon a cigarette $Z_1$. In other production line is in operation, the pairs of cigarettes $Z_1$, $Z_2$ in successive flutes 8 of the conveyor 1 are disposed in such a way that the cigarette $Z_2$ is more distant from the right-hand axial end of the conveyor 1 (as viewed in FIG. 2) than the corresponding coaxial cigarette $Z_1$. The cigarettes $Z_1$ are braked by suction in the respective suction ports 9b, and the cigarettes $Z_2$ are braked by suction in the respective suction ports 9a. Such ports first attract the respective cigarettes but generate a pronounced braking action as soon as they are overlapped by the wrappers of the respective cigarettes.

The suction ports 9a and 9b constitute highly effective means for arresting and holding the cigarettes $Z_2$ and $Z_1$ close to the optimum axial positions for further processing but such positions do not always match the optimum positions because this is normally achievable only with resort to mechanical stops in combination with suction ports or jets of compressed air. However, mechanical stops are likely to affect the appearance and/or the integrity of plain cigarettes at the speeds at which such articles are processed in the improved apparatus. Therefore, the conveyor 1 is followed by the aforediscussed conveyor 2 which is designed to move the cigarettes $Z_1$ and Z in each successive flute of the conveyor 2 into actual contact with one another. FIG. 5(I) shows the mutual spacing of two coaxial cigarettes $Z_1$ and $Z_2$ in a flute 8 of the conveyor 1, and FIG. 5(II) shows the mutual spacing of the same cigarettes upon completion of the shifting operation in the respective peripheral flute of the conveyor 2, i.e., the conveyor 2 ensures that the cigarettes $Z_1$ and $Z_2$ of each pair actually abut against each other so that the final and optimum mutual spacing of such cigarettes (on the conveyor 3) can begin from scratch and under identical starting conditions (abutment of the respective cigarettes against each other). FIG. 5(III) shows that, on the conveyor 3, the cigarettes $Z_1$ and $Z_2$ of each pair are moved axially and away from each other so that their mutual spacing (clearance C) suffices for unimpeded insertion of a filter plug F of double unit length (see FIG. 5(IV) showing a group of three coaxial articles $Z_1$, F, Z which are formed in the respective flute of the assembly conveyor 4).

The arrows indicate in FIG. 1 the directions in which the respective conveyors rotate (see also the arrow A in FIG. 2). It will be noted that the conveyor 7 inserts filter plugs F of double unit length into successive flutes of the assembly conveyor 4 ahead of the location where such flutes receive pairs of suitably spaced-apart plain cigarettes $Z_1$ and $Z_2$, i.e., the transfer station $T_1$ is located ahead of the transfer station $T_2$, as seen in the direction of (clockwise) rotation of the conveyor 4. The groups of three coaxial rod-shaped articles each are thereupon condensed by causing the one and/or the other plain cigarette of each group to move axially toward the other two components of the same group (e.g., by moving the groups between two stationary convergent cams 4a or in a manner as disclosed in the aforementioned patent to Brunswig). The thus obtained condensed groups are transferred onto the conveyor 6 and are converted into filter cigarettes of double unit length in a manner not forming part of the present invention.

FIG. 4 shows a portion of a modified apparatus wherein all such parts which are identical with or clearly analogous to the corresponding parts of the apparatus of FIG. 2 are denoted by the same reference characters or by similar reference characters plus 100. The main difference is that the two accelerating cams $B_1$ and $B_2$ are mounted on discrete parallel shafts 111', 111" which receive motion from two discrete variable-speed transmissions 112', 112". As can be seen in FIG. 4, the cams $B_1$ and $B_2$ are staggered with reference to each other, as considered in the direction of axial movement of the cigarettes $Z_1$ and $Z_2$, and the extent of such staggering is selected with a view to ensure that each of the flutes 108 at the periphery of the conveyor 101 receives a cigarette $Z_1$ as well as a cigarette $Z_2$. An advantage of the structure which is shown in FIG. 4 is that the lobes of the cams $B_1$ and $B_2$ can engage and entrain the wrappers of the respective cigarettes $Z_1$ and $Z_2$ exactly or nearly exactly midway between the axial ends of the respective articles.

An important advantage of the improved apparatus is its simplicity and compactness. Moreover, the apparatus can employ a substantial number of conventional components or components which are useful in the improved machine after minor alterations. Another important advantage of the improved apparatus is that it need not embody any means for simultaneously transferring pairs of cigarettes from two makers into the flutes of the conveyor 1 or an analogous conveyor, i.e., the cigarettes $Z_1$ and $Z_2$ are propelled into successive flutes 8 individually.

It is also possible to construct the apparatus of the present invention in such a way that one of the accelerating cams $B_1$, $B_2$ subjects the respective articles ($Z_1$, $Z_2$) to a more pronounced acceleration than the other cam. The illustrated embodiments are preferred at the present time because different acceleration by the cams $B_1$ and $B_2$ would necessitate the placing of such cams at a considerable distance from the intake ends 8a of the flutes 8 or 108 on the conveyor 1 or 101. This would account for the fact that the distance Y is less than the distances X between the centers of neighboring flutes 8 or 108. The just described modification with two cams, designed to subject the respective articles to different acceleration, exhibits the advantage that the acceleration of two neighboring articles in the guides $F_1$ and $F_2$ can take place simultaneously.

The conveyors 2 and 3 can be omitted if the conveyor 1 or 101 is provided with mechanical stops for the cigarettes $Z_1$ and $Z_2$. The drawbacks of mechanical stops were pointed out above. Moreover, and since the cigarettes which enter successive flutes 8 or 108 are delivered one after the other rather than simultaneously, it would be necessary to retract the stops for the cigarettes $Z_1$ during propulsion of cigarettes $Z_2$ because fixed stops for the cigarettes $Z_1$ would prevent axial advancement of cigarettes $Z_2$ to the positions which are shown in the flutes 8 of the conveyor 1 in FIG. 2. It has been found that the provision of conveyors 2 and 3 with associated moving means for the cigarettes $Z_1$ and or $Z_2$ thereon contributes less to the overall cost of the apparatus than the provision of movable stops for the cigarettes $Z_1$. Moreover, the conveyors 2, 3 are more likely to move the pairs of cigarettes $Z_1$ and $Z_2$ to optimum positions for the generation of clearances C which are in optimum positions (as considered axially of the conveyor 4) to receive filter plugs F at the transfer station $T_1$.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of manipulating rod-shaped articles of the tobacco processing industry, particularly for transferring plain cigarettes from two cigarette makers to a common filter tipping machine, comprising the steps of establishing for the articles discrete first and second paths which are parallel to each other, which are spaced apart from one another by a first distance, and which have adjacent discharge ends; establishing a plurality of third paths which are parallel to the first and second paths, which are spaced apart from one another by second distances deviating from said first distance, and which have intake ends disposed in a plane adjacent to the discharge ends of the first and second paths; circulating the third paths about an axis which is parallel to and equidistant from such third paths; advancing the articles axially along the first and second paths; and individually propelling into successive third paths first an article from one and thereupon an article from the other of the first and second paths so that each third path receives a pair of coaxial articles.

2. The method of claim 1, wherein the second distance exceeds the first distance.

3. The method of claim 2, wherein said propelling step includes alternately accelerating the foremost articles in the first and second paths.

4. The method of claim 2, wherein said circulating step comprises circulating the third paths in a predetermined direction so that the intake ends of successive third paths first advance past the discharge end of the second path and thereupon past the discharge end of the first path, said propelling step including accelerating successive foremost articles in the second path ahead of successive foremost articles in the first path.

5. The method of claim 2, wherein the articles of each pair of articles are spaced apart and further comprising the first additional step of moving at least one article of successive pairs of articles axially toward the other article of the respective pair, and the second additional step of thereupon moving at least one article of successive pairs of articles axially and away from the other article of the respective pair so as to establish between the articles of successive pairs clearances of predetermined width.

6. The method of claim 5, further comprising the step of removing said pairs of articles from the respective third paths prior to said additional steps.

7. The method of claim 5, wherein said first additional step includes moving at least one article of each pair into abutment with the other article of the respective pair.

8. Apparatus for manipulating rod-shaped articles of the tobacco processing industry, particularly for transferring plain cigarettes from two cigarette makers into a common filter tipping machine, comprising first and second guide means respectively defining parallel first and second elongated paths, said first and second guide means having adjacent discharge ends and said paths being disposed at a first distance from one another; a conveyor defining a plurality of third paths disposed at different second distances from one another, extending in parallelism with said first and second paths and having intake ends disposed in a plane adjacent to said discharge ends; means for moving said conveyor so as to circulate said third paths about an axis which is parallel to and equidistant from said third paths; means for respectively supplying first and second files of articles into said first and second paths so that the articles advance axially toward the respective discharge ends; and first and second accelerating means disposed in the regions of the respective discharge ends and operative to propel successive foremost articles from the respective guide means into the intake ends of successive third paths at intervals so that the propulsion of articles from said first path does not coincide with the propulsion of articles from said second path.

9. The apparatus of claim 8, wherein each of said second distances exceeds said first distance.

10. The apparatus of claim 8, wherein each of said accelerating means comprises a rotary member and each of said rotary members has at least one article-engaging surface, the article-engaging surfaces of said rotary members being angularly offset with reference to each other.

11. The apparatus of claim 8, wherein said first and second accelerating means are spaced apart from one another, as considered in the longitudinal direction of said first and second paths.

12. The apparatus of claim 8, wherein each of said accelerating means comprises a rotary accelerating member and further comprising means for rotating said members about a common axis which is normal to said first and second paths.

13. The apparatus of claim 8, further comprising a second conveyor arranged to receive pairs of articles from successive third paths and including means for moving at least one article of each pair axially to a predetermined position relative to the other article of the respective pair.

14. The apparatus of claim 13, wherein the pairs of articles in said third paths are spaced apart from one another and said moving means of said second conveyor includes means for moving at least one article of each pair into abutment with the other article of the respective pair.

15. The apparatus of claim 13, wherein the pairs of articles in said third paths are spaced apart from one another and said moving means of said second conveyor comprises means for moving at least one article of each pair toward the other article of the respective pair.

16. The apparatus of claim 15, further comprising a third conveyor arranged to receive successive pairs of articles from said second conveyor and including means for moving at least one article of each pair axially and away from the other article of the respective pair so that the articles of each pair define between themselves a clearance of predetermined width.

17. The apparatus of claim 16, wherein said third conveyor comprises a set of first receiving means each arranged to receive the one article of a pair of coaxial articles and a second set of receiving means each arranged to receive the other article of a pair of coaxial articles, said moving means of said third conveyor including means for moving the receiving means of said first set toward and away from the receiving means of said second set.

* * * * *